United States Patent
Matsui et al.

(10) Patent No.: US 10,452,112 B2
(45) Date of Patent: Oct. 22, 2019

(54) INFORMATION PROCESSING APPARATUS, INFORMATION PROCESSING METHOD, AND RECORDING MEDIUM RECORDING COMPUTER-READABLE PROGRAM

(71) Applicant: CANON KABUSHIKI KAISHA, Tokyo (JP)

(72) Inventors: Keisuke Matsui, Tokyo (JP); Yasusaburo Degura, Tokyo (JP); Hiroshi Moritomo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 15/634,794

(22) Filed: Jun. 27, 2017

(65) Prior Publication Data
US 2018/0004279 A1    Jan. 4, 2018

(30) Foreign Application Priority Data

Jul. 4, 2016    (JP) ................................ 2016-132871

(51) Int. Cl.
| | |
|---|---|
| G06F 1/26 | (2006.01) |
| G06F 1/32 | (2019.01) |
| G06F 3/048 | (2013.01) |
| G06F 1/3234 | (2019.01) |
| G06F 1/3212 | (2019.01) |
| G06F 3/0484 | (2013.01) |

(52) U.S. Cl.
CPC .............. *G06F 1/266* (2013.01); *G06F 1/263* (2013.01); *G06F 1/325* (2013.01); *G06F 1/3212* (2013.01); *G06F 3/04847* (2013.01); *Y02D 10/174* (2018.01)

(58) Field of Classification Search
CPC ........ G06F 1/266; G06F 1/263; G06F 1/3212; G06F 3/04847
See application file for complete search history.

(56) References Cited

U.S. PATENT DOCUMENTS

| | | | |
|---|---|---|---|
| 9,531,551 B2* | 12/2016 | Balasubramanian | ... H04L 12/10 |
| 9,632,555 B2* | 4/2017 | Lester | ..................... G06F 13/00 |
| 10,122,576 B2* | 11/2018 | Bhesania | ............ H04L 41/0803 |
| 2017/0366028 A1* | 12/2017 | Nicholson | ............. H02J 7/0054 |

FOREIGN PATENT DOCUMENTS

JP    5578209 B2    8/2014

* cited by examiner

*Primary Examiner* — Stefan Stoynov
(74) *Attorney, Agent, or Firm* — Canon U.S.A., Inc. IP Division

(57) ABSTRACT

If apparatuses capable of both power transmission and power reception are connected to each other, power may circulate needlessly between the apparatuses and be consumed. Power control is then performed based on a determined power control policy by providing display for determining a direction of power transfer when needed.

19 Claims, 12 Drawing Sheets

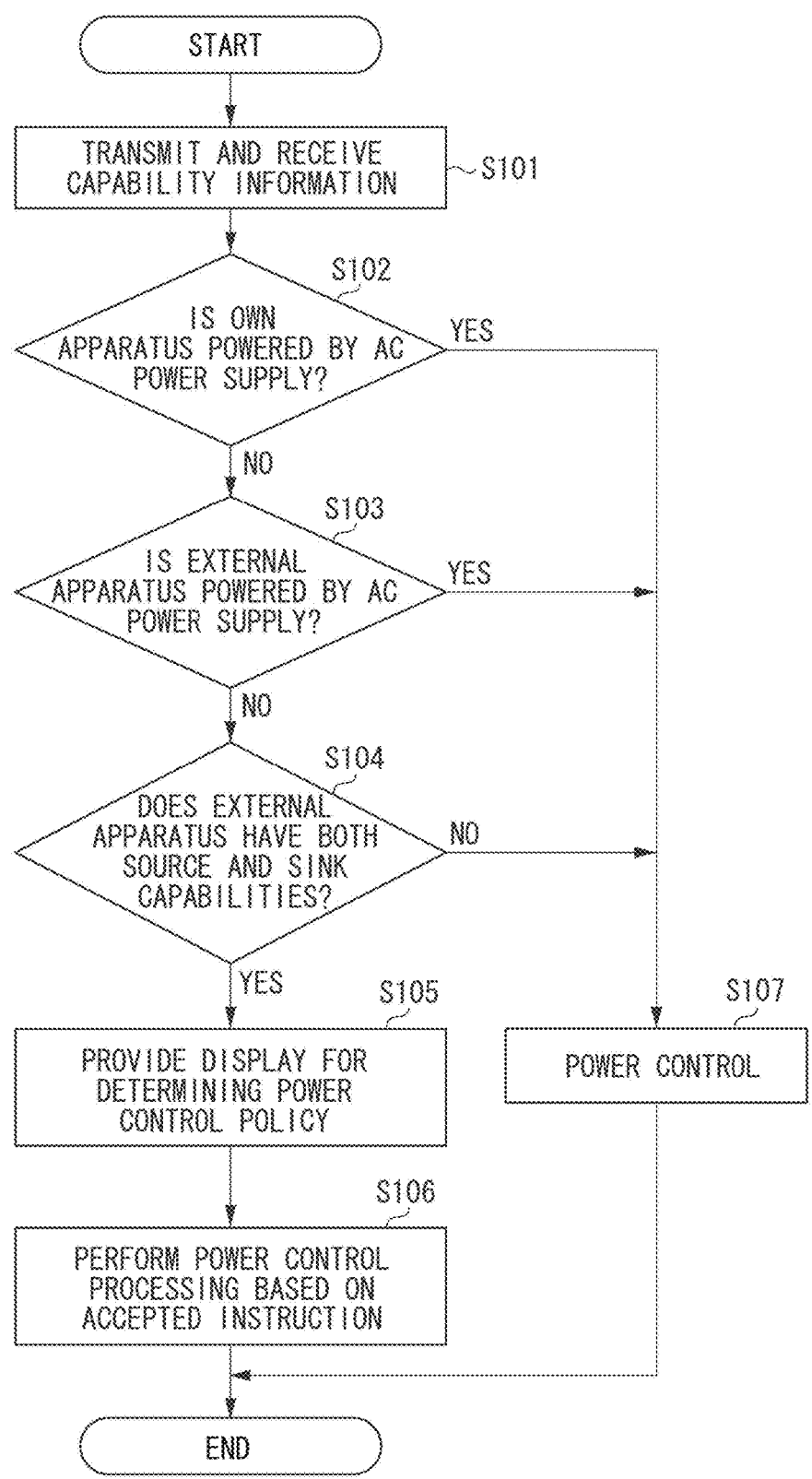

FIG. 3A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B12 | B11 | B10 | B9 | B8 | B7 | B6 | B5 | B4 | B3 | B2 | B1 |

USB Type-C Receptacle Interface

FIG. 3B

| a12 | a11 | a10 | a9 | a8 | a7 | a6 | a5 | a4 | a3 | a2 | a1 |
|---|---|---|---|---|---|---|---|---|---|---|---|
| GND | RX2+ | RX2− | VBUS | SBU1 | D− | D+ | CC | VBUS | TX1− | TX1+ | GND |
| GND | TX2+ | TX2− | VBUS | VCONN | | | SBU2 | VBUS | RX1− | RX1+ | GND |
| b1 | b2 | b3 | b4 | b5 | b6 | b7 | A8 | b9 | b10 | b11 | b12 |

USB Type-C Plug Interface

FIG. 10
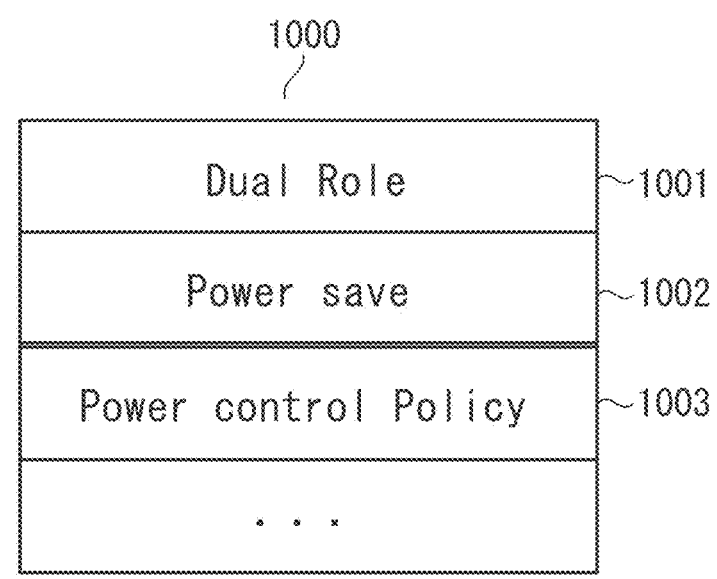
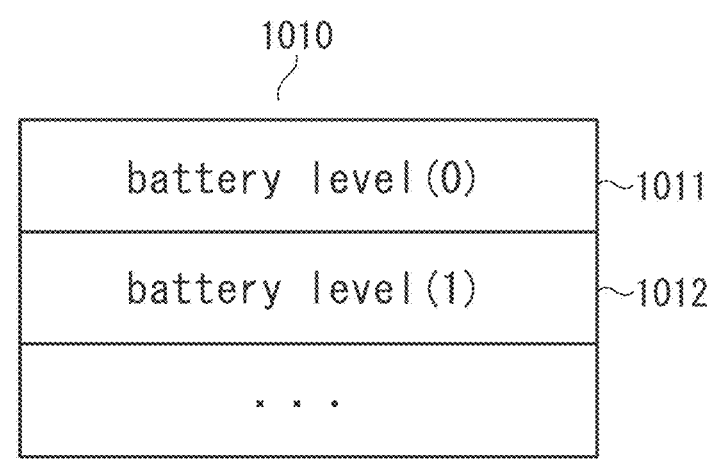

INFORMATION PROCESSING APPARATUS, INFORMATION PROCESSING METHOD, AND RECORDING MEDIUM RECORDING COMPUTER-READABLE PROGRAM

BACKGROUND OF THE INVENTION

Field of the Invention

The aspect of the embodiments relates to an information processing apparatus, an information processing method, and a recording medium recording a computer-readable program.

Description of the Related Art

For a wired communication interface for connecting to an information processing apparatus, there are techniques by which power can be transferred in parallel with data transfer. Typical examples include Universal Serial Bus (USB).

If apparatuses are connected via a cable, a technique called USB Power Delivery (USB-PD) can be used to determine which of the apparatuses to supply power to the other connected apparatus more freely than with conventional USB apparatuses. Conventional USB apparatuses not supporting USB-PD have been only capable of power supply from a host apparatus (host) to a peripheral apparatus (device).

As the degree of freedom of power supply control increases, the possibility of occurrence of power supply unintended by a user can increase as well. Some kind of countermeasures may therefore be needed.

For example, Japanese Patent No. 5578209 discusses a technique for a vehicle power control apparatus including a storage battery. According to the technique, if connection terminals are connected to both a charging terminal and a discharging terminal, the vehicle power control apparatus temporarily stops charging the storage battery in view of erroneous charging.

If apparatuses capable of both power transmission and power reception are connected to each other, power may circulate needlessly between the apparatuses and be consumed. For example, suppose that the apparatuses continue to be controlled so that one having a higher remaining battery level by ratio continues to supply power to lower one. If the remaining battery levels of the two apparatuses frequently change places in magnitude, power can reciprocate between the apparatuses repeatedly.

According to the technique discussed in Japanese Patent No. 5578209, the direction of power transfer is uniquely determined for each cable and connector. Such a technique is difficult to apply to apparatuses that have a connector into which a cable serving both as a charging terminal and as a discharging terminal can be plugged.

SUMMARY OF THE INVENTION

According to an aspect of the embodiments, an apparatus includes an acquisition unit configured to obtain capability information from an external apparatus via a connection unit, the capability information indicating that the external apparatus is capable of switching between a function as a source and a function as a sink, an acceptance unit configured to accept an instruction from a user based on the capability information, and a control unit configured to perform control about one of a plurality of states based on the instruction, the plurality of states including a power transmission state in which power is transmitted to the external apparatus and a power reception state in which power is received from the external apparatus.

According to the aspect of the embodiments, reciprocation of power between devices can be suppressed to reduce unnecessary power loss.

BRIEF DESCRIPTION OF THE DRAWINGS

The accompanying drawings, which are incorporated in and constitute a part of the specification, illustrate exemplary embodiments, features and aspects of the disclosure and, together with the description, serve to explain the principles of the disclosure.

FIG. 1 is a flowchart illustrating an outline of processing for determining a power control policy of an information processing apparatus.

FIG. 3A is a schematic diagram illustrating a pin configuration of a receptacle of the USB control unit. FIG. 3B is a schematic diagram illustrating a pin configuration of a plug.

FIG. 10 is a schematic diagram illustrating an overview of contents stored in a configuration register and a status register.

DETAILED DESCRIPTION OF PREFERRED EMBODIMENTS

Exemplary embodiments, features and aspects of the disclosure will now be described in detail below with reference to the attached drawings.

A first exemplary embodiment of the disclosure will be described in detail below with reference to the drawings. Initially, a hardware configuration of the first exemplary embodiment will be described with reference to FIGS. 2A and 2B.

Figure 2A:
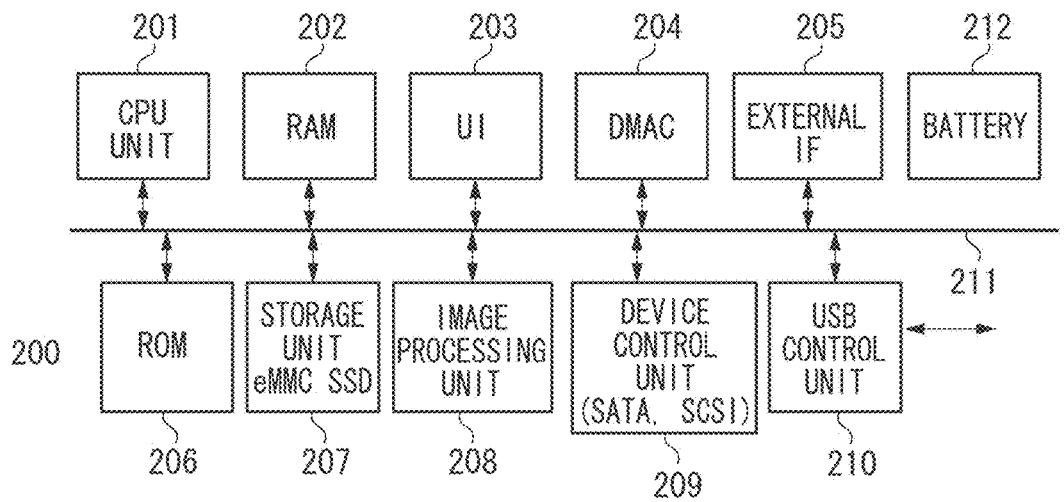
FIG. 2A is a schematic diagram illustrating a configuration of the information processing apparatus.

FIG. 2A is a schematic diagram illustrating a configuration of an information processing apparatus 200 to which an exemplary embodiment of the disclosure is applied. Examples of the information processing apparatus 200 may include portable devices such as a laptop computer, a tablet, a smartphone, and a digital camera. However, an exemplary embodiment of the disclosure may be applied to other devices. A read-only memory (ROM) 206 stores a program for implementing a flowchart of the present exemplary embodiment to be described below. A central processing unit (CPU) unit 201 uses a direct memory access controller (DMAC) 204 to load the program of the ROM 206 into a random access memory (RAM) 202, reads the program from the RAM 202, and executes processing including the contents of the flowchart to be described below. The RAM 202 may include a synchronous dynamic random access memory (SDRAM) compliant with a double data rate (DDR) standard.

A graphic user interface 203 (hereinafter, referred to simply as a UI) functions as an acceptance unit for accepting instructions from a user, and allows the user to use various functions of the information processing apparatus 200. The UI 203 may include a plurality of buttons, a display, and a touch panel. An external interface (IF) 205 includes wired and wireless network interfaces and external interfaces such as USB and Peripheral Component Interface Express (PCIe) interfaces. A storage unit 207 includes a storage device which functions as a high-capacity nonvolatile memory. Examples include a solid state drive (SSD) and an embedded Multi Media Card (eMMC). The storage unit 207 stores a code of an operating system (OS). An image processing unit 208 is a graphic accelerator (or graphics processing unit (GPU)) which performs various types of image processing according to requests from the CPU unit 201.

A bus 211 is a bus for communicably connecting components. A device control unit 209 includes a chipset for controlling data exchange between the CPU unit 201 and other components.

Figure 2B:
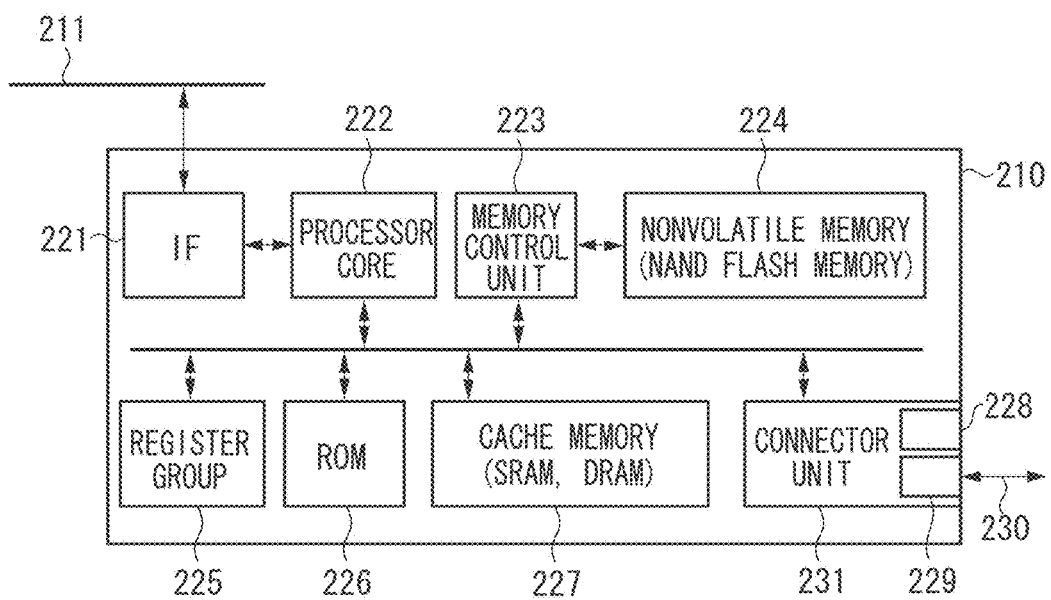
FIG. 2B is a schematic diagram illustrating a configuration of a Universal Serial Bus (USB) control unit.

FIG. 2B is a schematic diagram illustrating a detailed configuration of a USB control unit 210 which functions as a power control unit in the present exemplary embodiment. A nonvolatile memory 224 includes a NAND flash memory (hereinafter, referred to simply as a flash memory), and can retain information in a nonvolatile manner without supply of electric charges. A ROM 226 stores programs for controlling the USB control unit 210. A processor core 222 reads and executes the programs. For example, the ROM 226 stores programs for implementing a data transfer function compliant with a USB standard and data transfer by the Media Transfer Protocol (MTP) and Picture Transfer Protocol (PTP) to be described below, a program for implementing a power control function, and device information (device identifier (ID) and vendor ID) about the own apparatus.

A register group 225 includes a general-purpose register, a configuration register, and a status register. The general-purpose register stores intermediate values when the processor core 222 performs calculations. The configuration register stores settings (parameters and power control policies) for the processor core 222 to control the USB control unit 210. The status register stores information by which the processor core 222 indicates a state of the information processing apparatus 200, based on information from the CPU unit 201. Details of the configuration register and the status register will be described below. An IF 221 connects the bus 211 and the processor core 222. For example, the IF 221 interprets information transmitted via the bus 211 and transmits the resultant to the processor core 222. A cache memory 227 includes a static random access memory (SRAM) and a dynamic random access memory (DRAM). The cache memory 227 temporarily stores data to be written to the nonvolatile memory 224 and data read from the nonvolatile memory 224.

A memory control unit 223 includes a controller for controlling the flash memory included in the nonvolatile memory 224. The memory control unit 223 performs read and write processing on the flash memory of the nonvolatile memory 224 based on instructions from the processor core 222. More specifically, the memory control unit 223 includes an address register and a command register. The address register stores an address of the nonvolatile memory 224 to be accessed by an access instruction from the processor core 222. The command register stores a command indicating the content of the access. The memory control unit 223 controls the nonvolatile memory 224 according to the contents stored in such registers.

A connector unit 231 includes at least one or more receptacles serving as USB Type-C connection units (connectors). The connector unit 231 includes a not-illustrated 4b5b codec or a not-illustrated biphase mark code (BMC) codec. The connector unit 231 can obtain, decode, and transfer, to the processor core 222, information symbolized by 4b5b conversion and information encoded by the BMC. The connector unit 231 according to the present exemplary embodiment includes a connection unit 228 (first connection unit) and a connection unit 229 (second connection unit). The connection units 228 and 229 are each configured to function as a receptacle into which a USB Type-C plug can be inserted. A cable 230 is a cable compatible with USB-PD. A plug (male) at an end of the cable 230 can be detachably attached to a receptacle (female) of the connector unit 231. The other end of the cable 230 is connected to various devices. The connector unit 231 is configured so that power received from outside via the cable 230 can be supplied to a battery 212.

The battery 212 is a lithium ion rechargeable battery. The battery 212 functions as a power supply for supplying direct-current (DC) power to the information processing apparatus 200. The battery 212 can store power received from the connector unit 231 and an alternating-current power supply (not illustrated).

The nonvolatile memory 224 and the ROM 226 retain memory contents even after the information processing apparatus 200 is powered off. Other components such as the processor core 222, the register group 225, and the cache memory 227 lose their memory contents by power-off or a reset operation.

Figure 9:
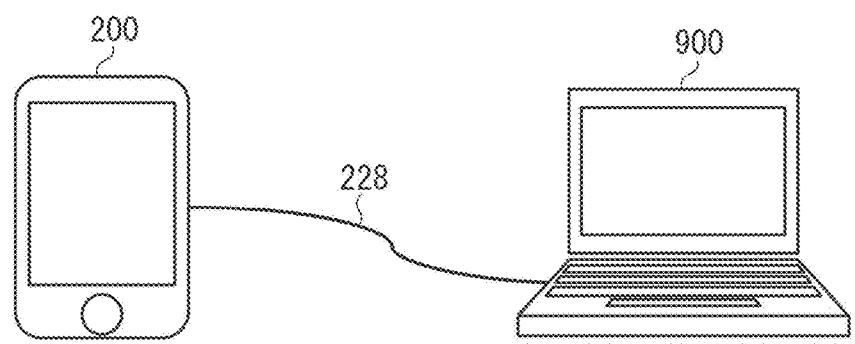
FIG. 9 is a schematic diagram illustrating how two apparatuses are connected to be capable of power transmission or power reception.

FIG. 9 illustrates a mode in which the information processing apparatus 200 implements processing of an exemplary embodiment of the disclosure. FIG. 9 is a schematic diagram illustrating how the information processing apparatus 200 and another information processing apparatus 900 (hereinafter, referred to as an external apparatus 900) are connected to be capable of power transmission or power reception in a wired manner. The external apparatus 900 has functions similar to those of the configurations illustrated in FIGS. 2A and 2B. A detailed description thereof will be omitted.

Next, an operation of the information processing apparatus 200 according to the present exemplary embodiment will be described with reference to FIG. 1. FIG. 1 is a flowchart illustrating an outline of processing by which the information processing apparatus 200 determines a power control policy after the information processing apparatus 200 is USB-connected with the external apparatus 900 and control communication is established. As employed herein, a power control policy refers to a control policy including how the information processing apparatus 200 transmits power to the external apparatus 900 or how the information processing apparatus 200 receives power from the external apparatus 900.

Referring to FIG. 1, in step S101, the processor core 222 of the information processing apparatus 200 transmits capability information about the own apparatus to the external apparatus 900 and receives capability information about the external apparatus 900 from the external apparatus 900 via a configuration channel (CC) pin of a Type-C connector of the connector unit 231. The received capability information is stored in the cache memory 227. As employed herein, the capability information includes power transmission capability information and power reception capability information. The power transmission capability information describes how the own apparatus can supply power in a power transmission state in which the own apparatus functions as a source. The power reception capability information describes how the own apparatus receives power and operates in a power reception state in which the own apparatus functions as a sink. Details of the capability information will be described below with reference to the packet format of FIGS. 4A to 4D.

In step S102, the processor core 222 of the information processing apparatus 200 refers to the information in the status register of the register group 225, and determines whether power is supplied from an external power supply different from the external apparatus 900 connected to the connector unit 231. For example, the processor core 222 determines whether the own apparatus is powered by an AC power supply (for example, an AC-DC adapter or a wall wart). If the power transmission capability information transmitted from the information processing apparatus 200 to the external apparatus 900 in step S101 indicates that an Externally Powered bit (external power supply information 434 to be described below) is disabled, the processor core 222 may determine no. If no (NO in step S102), the processing proceeds to step S103.

In step S103, the processor core 222 refers to the cache memory 227 and determines whether the external apparatus 900 is powered by an AC power supply. Specifically, the processor core 222 determines whether an Externally Powered bit included in the capability information received from the external apparatus 900 indicates disabled. If no (NO in step S103), the processing proceeds to step S104.

In step S104, the processor core 222 refers to the cache memory 227 and determines whether the external apparatus 900 has both source and sink capabilities. Specifically, the processor core 222 determines whether a Dual-Role Power bit (power role information 432 to be described below) included in the capability information received from the external apparatus 900 indicates enabled. If yes (YES in step S104), the processing proceeds to step S105.

In step S105, the processor core 222 performs control to provide display for determining the power control policy. Specifically, the processor core 222 interrupts the CPU of the CPU unit 201. The interrupted CPU unit 201 controls the UI 203 to provide display for accepting an instruction for the power control policy from the user (details of the power control policy will be described below). The image processing unit 208 may perform part of drawing processing for display. The instruction from the user includes information for determining at least one of the following: "transmit power", "receive power", and "neither transmit nor receive power". The processor core 222 keeps power control processing on standby until an instruction is accepted from the user. If an instruction is accepted from the user, the processing proceeds to step S106.

In step S106, the processor core 222 functions as a determination unit for determining the power control policy based on the instruction accepted from the user, and writes the contents of the determined power control policy into the configuration register of the register group 225. The processor core 222 then performs power control processing based on the determined power control policy. Details of the power control processing will be described below with reference to FIG. 8. Before performing the power control processing, the processor core 222 may access the configuration register of the register group 225 to cancel a Dual Role setting of the information processing apparatus 200. By such processing, the Dual Role setting is canceled until the processor core 222 is reset. For example, if the USB control unit 210 accepts a reset request from the external apparatus 900, the processor core 222 resets itself to initialize the contents of the register group 225. The Dual Role setting is thereby restored. If an instruction to "neither transmit nor receive power" is accepted from the user in step S105, the processing of step S106 is omitted.

If yes in step S102, yes in step S103, or no in step S104 (YES in step S102, YES in step S103, or NO in step S104), the processing proceeds to step S107. In step S107, the processor core 222 controls the information processing apparatus 200 as a source if the own apparatus is powered by an AC power supply. The processor core 222 controls the information processing apparatus 200 as a sink if the external apparatus 900 is powered by an AC power supply. If the external apparatus 900 has either one of the source and sink capabilities (the power role information 432 to be described blow is disabled), the processor core 222 controls the information processing apparatus 200 as an apparatus corresponding to the capability of the external apparatus 900 (as a sink if the external apparatus 900 is a source, and as a source if the external apparatus 900 is a sink).

<Power Control Policy>

Figure 5:
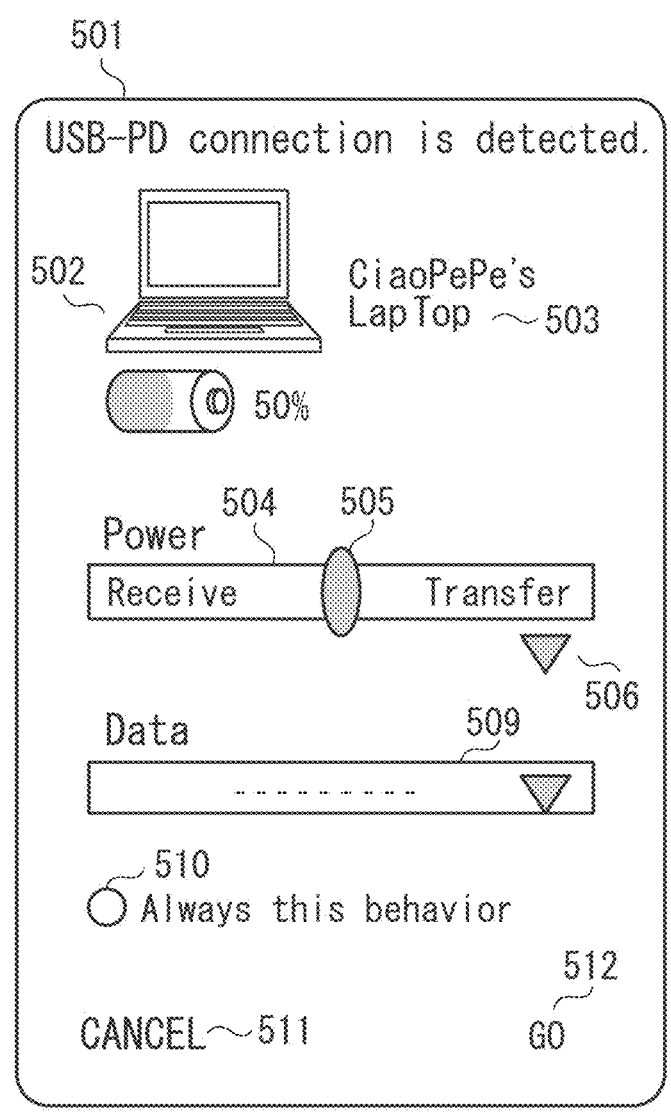
FIG. 5 is a schematic diagram illustrating a display screen for determining the power control policy.

FIG. 5 illustrates an example of a setting screen that the UI 203 displays in step S105 of FIG. 1. In the present exemplary embodiment, the UI 203 is a capacitive touch panel.

The UI 203 displays a window 501 in response to an interrupt from the USB control unit 210. An icon section 502 displays an icon indicating the type of the external apparatus 900 and an icon indicating the remaining battery level of the external apparatus 900. A name 503 is a name of the external apparatus 900. Device information (device ID and vendor ID) about the external apparatus 900 may be displayed as the name 503.

A slide bar 504 is intended to determine the power control policy of the information processing apparatus 200. The user can horizontally move a slider 505 on the slide bar 504 to select conditions "transmit power" (transfer) and "receive power" (receive) as power control policies. The user can select a condition "neither transmit nor receive power" by not moving the slider 505. The display may be changed and/or the operation of the slider 505 may be limited based on the capability information received from the external apparatus 900. For example, if the external apparatus 900 is not able to supply power in a level needed for the information processing apparatus 200, the external apparatus 900 can only function as a sink. The slider 505 may then be made movable only to the "transmit power" side. A half of the slide bar 504 on the "receive power" side may be grayed out.

A button 506 accepts the user's touch to display options for setting the power control policy in more detail (details will be described below).

A pulldown section 509 accepts the user's touch to display options for setting a data transfer policy in more detail (details will be described below with reference to FIG. 7).

A radio button 510 can make a setting to cause the apparatus displayed in the name 503 to "store the selections made by the user on the window 501 and skip a call for the window 501 in step S105 of FIG. 1 next time".

A cancel button 511 is a button for rejecting the settings made from the window 501. An execution button 512 is a button for reflecting the settings made from the window 501.

If the user's touch on the execution button 512 is accepted with the setting of the radio button 510 enabled, the processor core 222 stores device setting information associating the condition set by the user from the window 501 and the device information into the nonvolatile memory 224.

Although omitted in the description of FIG. 1, if the processing proceeds to step S105, the processor core 222 searches the nonvolatile memory 224 by using the device information as a query. If there is a hit for the search, there is device setting information previously set by the user in the nonvolatile memory 224. The processor core 222 performs the control of step S106 based on the device setting information stored in the hit entry.

If the device setting information stored in the nonvolatile memory 224 is used, the user may be notified of the use of the device setting information and a re-setting button for a predetermined time by a pop-up so that the user is prompted to re-set the device setting information. If the re-setting button is detected to be touched by the user, the processor core 222 performs the processing from step S105 again without searching the nonvolatile memory 224.

Figure 6:
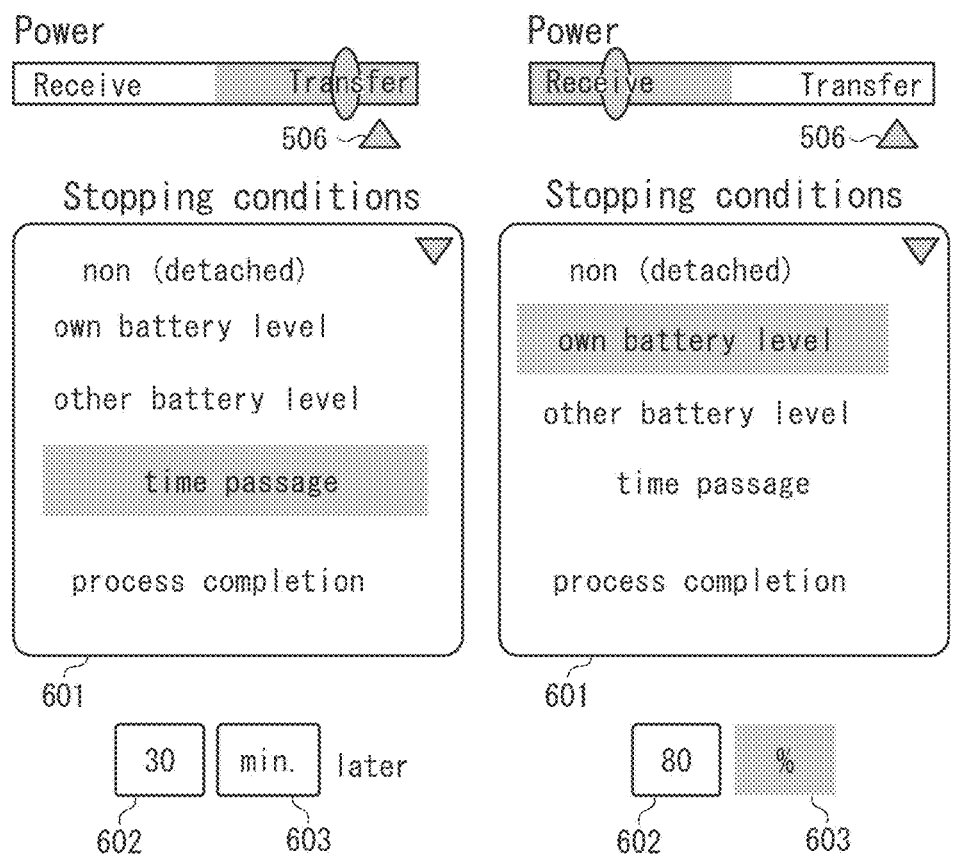
FIG. 6A is a schematic diagram illustrating a display screen for setting a condition to stop power transmission from an information processing apparatus 200.
FIG. 6B is a schematic diagram illustrating a display screen for setting a condition to stop power reception by the information processing apparatus 200.

FIG. 6A illustrates part of a screen further displayed on the window 501 if the slide bar 504 is operated to select the setting that the information processing apparatus 200 transmits power and the button 506 is operated to choose to make detailed settings. A pulldown section 601 presents a selectable list of conditions (power transmission stopping conditions) for stopping power transmission by the information processing apparatus 200.

"non (detached)" is a condition selected in an initial state. For example, "non (detached)" refers to a condition that "the information processing apparatus 200 transmits power until the plug of the cable 230 is unplugged and disconnected from the connector unit 231". "own battery level" refers to a condition that "power transmission from the information processing apparatus 200 is stopped if the remaining battery level of the battery 212 of the information processing apparatus 200 reaches a predetermined value (predetermined ratio)". "other battery level" refers to a condition that "power transmission from the information processing apparatus 200 is stopped if the remaining battery level of the external apparatus 900 reaches a predetermined value". "time passage" refers to a condition that "power transmission or power reception is stopped if the duration of the power transmission or power reception reaches a predetermined time". "process completion" refers to a condition that "power transmission or power reception is stopped if processing of the information processing apparatus 200 related to data transmission and reception is completed or if the information processing apparatus 200 enters a power saving mode".

Columns 602 and 603 are intended to set details of the condition set in the pulldown section 601 (remaining battery level or elapsed time). In the example of FIG. 6A, "time passage" is selected in the pulldown section 601. A natural number (any one of 1 to 99) can be input to the column 602. A unit (either one of "minute(s)" and "hour(s)") can be selected in the column 603.

FIG. 6B illustrates part of a screen further displayed on the window 501 if the slide bar 504 is operated to select the setting that the information processing apparatus 200 receives power, and the button 506 is operated to choose to make detailed settings. The pulldown section 601 presents a selectable list of conditions (power reception stopping conditions) for stopping power reception by the information processing apparatus 200. The options selectable in the pulldown section 601 are similar to those of FIG. 6A, with only a difference that the conditions for stopping power transmission are replaced with ones for stopping power reception. A detailed description thereof will thus be omitted.

In the example of FIG. 6B, "own battery level" is selected in the pulldown section 601. The unit in the column 603 is then fixed to %. A natural number (any one of 1 to 99) can be input to the column 602.

Figure 7:
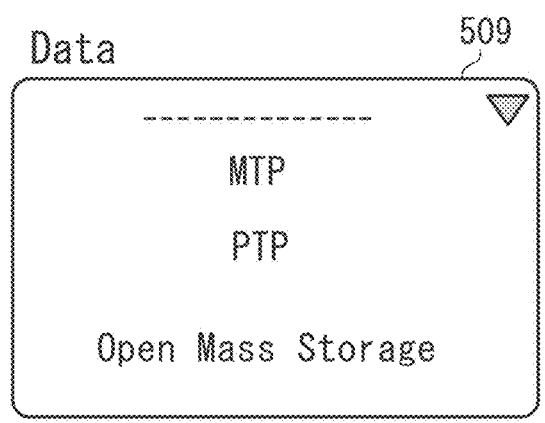
FIG. 7 is a schematic diagram illustrating a pulldown menu for setting a data transfer policy.

FIG. 7 illustrates details of the settings selectable in the pulldown section 509. "MTP" is a setting for transferring data between the information processing apparatus 200 and the external apparatus 900 by the MTP. This setting is selected to make the information processing apparatus 200 function as an MTP initiator, and the external apparatus 900 as an MTP responder.

"PTP" is a setting for transferring data by PTP.

"Open Mass Storage" causes the external apparatus 900 to function as a mass storage device (USB mass storage class). The information processing apparatus 200 opens the top folder (or root folder) of the mass storage device of the external apparatus 900.

With the MTP, the information processing apparatus 200 serving as an MTP initiator can comprehend the file system of the external apparatus 900. This enables more favorable operation than when the external apparatus 900 is operated as a USB mass storage device, since self-access on the external apparatus 900 side and file access from the information processing apparatus 200 can be controlled not to conflict.

Figure 8:
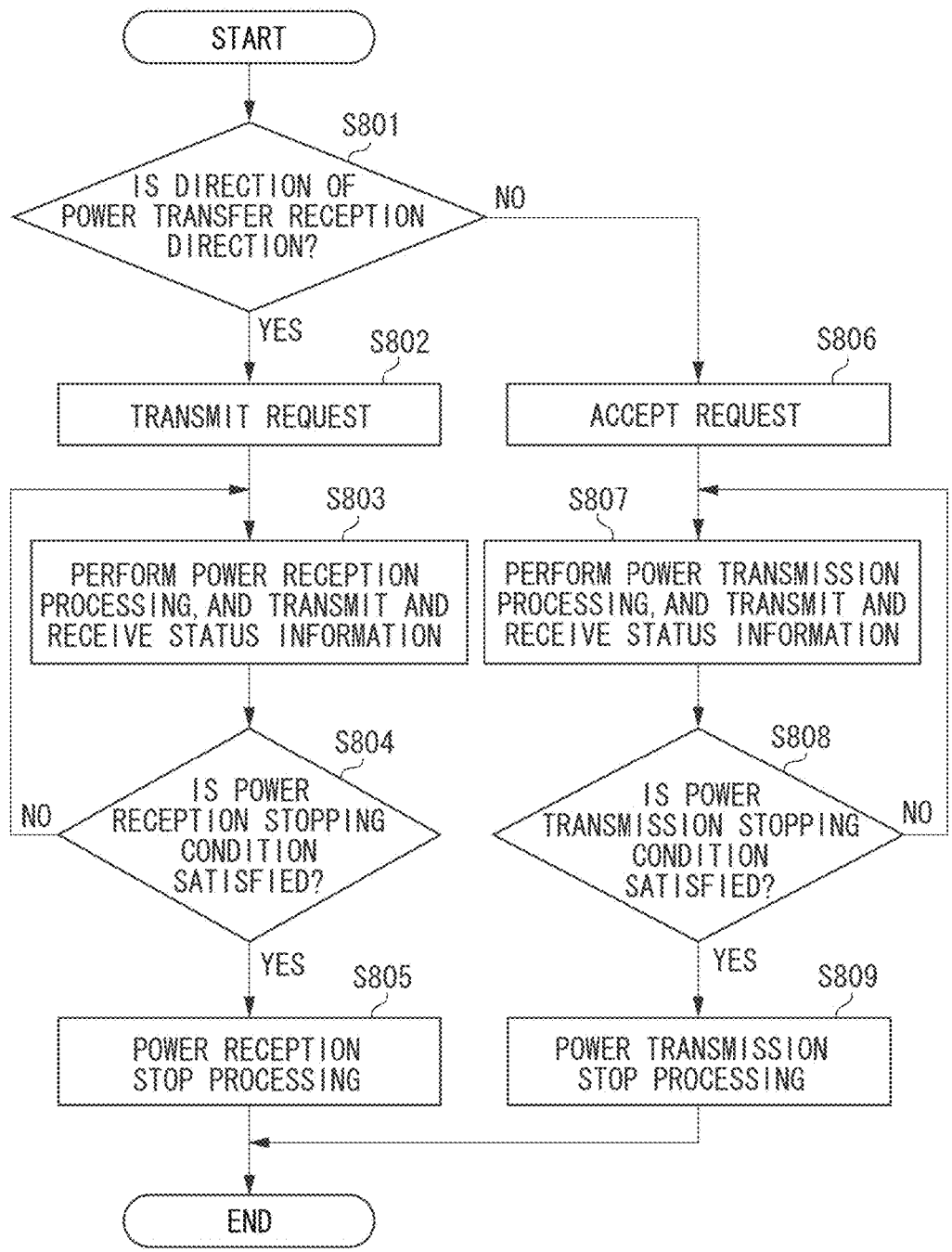
FIG. 8 is a flowchart illustrating details of power control processing.

FIG. 8 illustrates details of the power control processing in step S106 of FIG. 1.

In step S801, the processor core 222 determines the direction of power transfer which is included in the instruction accepted in step S105. If the direction of power transfer is a reception direction (YES in step S801), the processing proceeds to step S802. If the instruction accepted in step S105 includes the condition "neither transmit nor receive power" selected by the slider 505 of FIG. 5, the processing continues to loop in step S105 itself until either "transmit power" or "receive power" is selected by the slider 505.

In step S802, the processor core 222 determines whether the status of the own apparatus is a sink. If the own apparatus is set as a source, the processor core 222 performs a role swap procedure to set the information processing apparatus 200 as a sink and the external apparatus 900 as a source. The reason is that when the information processing apparatus 200 and the external apparatus 900 establish a USB-PD connection therebetween, the role of a sink is assigned to either one of the apparatuses and the role of a source to the other as initial settings, which are reflected on the configuration registers of the respective apparatuses. The processor core 222 further outputs (transmits) to the external apparatus 900 a request for making the other apparatus function as a source so that the information processing apparatus 200 operates as a sink. Such a request is determined based on the capability information received from the external apparatus 900 in step S101. More specifically, the USB control unit 210 outputs a request including, as requested power information, a power level (a set of a current value and a voltage value) requested by the information processing apparatus 200 among a plurality of possible power levels notified from the external 900 to the information processing apparatus 200. If a power reception stopping condition is set by the pulldown section 601, a USB control unit of the external apparatus 900 is set not to enter the power saving state. Specifically, the USB control unit 210 outputs a request in which the USB control unit 210 sets power saving limitation information ("No USB Suspend flag" in the request is set to 1).

In step S803, the USB control unit 210 of the information processing apparatus 200 performs power reception processing, and transmits and receives status information. The power reception is started after the request output in step S802 is accepted by the external apparatus 900 and a notification that the external apparatus 900 is ready for power transmission (power transmission ready) is confirmed to be issued. The USB control unit 210 outputs status information including the remaining level of the battery 212 of the information processing apparatus 200 to the external apparatus 900, and receives status information about the external apparatus 900.

In step S804, the processor core 222 determines whether the power reception stopping condition is satisfied, based on the status information about the information processing apparatus 200 or the external apparatus 900 and the power reception stopping condition. If the power reception stopping condition is not satisfied (NO in step S804), the processing proceeds to step S803 to continue the power reception processing. If the power reception stopping condition is satisfied (YES in step S804), the processing proceeds to step S805. In step S805, the processor core 222 performs power reception stop processing. The USB control unit 210 notifies the external apparatus 900 of a stop of power transmission. If the USB control unit of the external apparatus 900 is set not to enter the power saving state by the request of step S802, the external apparatus 900 clears the setting based on the notification.

In step S801, if the direction of power transfer is a transmission direction (NO in step S801), the processing proceeds to step S806. In step S806, the processor core 222 determines whether the status of the information processing apparatus 200 is a source. If the information processing apparatus 200 here is set as a sink, the processor core 222 performs a role swap procedure to set the information processing apparatus 200 as a source and the external apparatus 900 as a sink. The USB control unit 210 further accepts a request from the external apparatus 900. If the accepted request includes a request to temporarily restrict the USB control unit 210 from entering the power saving state, the processor core 222 thus sets the configuration register of the register group 225.

In step S807, the USB control unit 210 of the information processing apparatus 200 performs power transmission processing, and transmits and receives status information. In starting power transmission, the USB control unit 210 notifies the external apparatus 900 that the request received from the external apparatus 900 is accepted in step S806 and that the information processing apparatus 200 is ready for power transmission. After notification that the external apparatus 900 is ready for power reception (power reception ready), the USB control unit 210 transmits power. The transmission and reception of the status information is similar to that in step S803. A description thereof will thus be omitted.

In step S808, the processor core 222 determines whether the power transmission stopping condition is satisfied, based on the status information about the information processing apparatus 200 or the external apparatus 900 and the power transmission stopping condition. If the power transmission stopping condition is not satisfied (NO in step S808), the processing proceeds to step S807 to continue the power transmission processing. If the power transmission stopping condition is satisfied (YES in step S808), the processing proceeds to step S809. In step S809, the processor core 222 performs power transmission stop processing. The USB control unit 210 notifies the external apparatus 900 of a stop of power transmission. If the USB control unit 210 is set not to enter the power saving state based on the request accepted in step S806, the processor core 222 accesses the configuration register to clear the setting when issuing the notification.

The USB control unit 210 also uses the CC pin for a power reception request and for transmission and reception of status information.

<Connector Unit 231 and Cable 230>

FIG. 3A illustrates a pin configuration of a Type-C receptacle which functions as the connection units 228 and 229 of the connector unit 231.

The USB Type-C defines a reversible plug having an oval cross section. The twelve pins on the A side have the same configuration as that of the twelve pins on the B side when reversed. Pins A1 (B1) and A12 (B12) are ground, and serve as paths for returning a return current. Pins A2 (B2) and A3 (B3) are differential signal lines for transmitting serial data corresponding to the USB Super Speed mode from the information processing apparatus 200. A Pin A4 (B4) is a bus power signal line which plays a main role in power supply.

A Pin A5 (B5) is a control signal line called "CC". Pin A5 (B5) is intended to perform a search (discovery) for USB devices, and control communication with a cable and the connected device. For example, the CC pin is used for transmission and reception processing of capability information in step S101 of FIG. 1 and to exchange various types of control information. In fact, either one of pins A5 and B5 that is connected to the CC pin on the plug side functions as "CC". For ease of description, both pins A5 and B5 will be referred to as a CC pin.

Pins A6 (B6) and A7 (B7) are differential signal lines for USB 2.0-compliant data transfer. A Pin A8 (B8) is an accessory signal line. The Pin A8 (B8) is used in using a secondary bus function or extending the functionality of the interface. A Pin A9 (B9) is intended for bus power. Pin A9 (B9) is similar to the foregoing pin A4. Pins A10 (B10) and A11 (B11) are differential signal lines for the information processing apparatus 200 to receive serial data corresponding to the USB Super Speed mode.

FIG. 3B illustrates a pin configuration of a Type-C plug of the cable 230. If the plug is inserted into a receptacle serving as the connection unit 228 or 229, A pin a1 of the plug is connected to the pin A1 or B1 of the receptacle. Since the receptacle has upper and lower, two sets of pins having equivalent functions, the plug inserted in a vertically flipped position connects similarly. To implement only USB 3.1 data transfer functions, the plug may include either one of the sets of pins a1 to a12 (hereinafter, set a) and b1 to b12 (hereinafter, set b). To supply a voltage corresponding to "USB- PD", the V$_{BUS}$ pins a4, a9, b4, and b9 may be needed. The V$_{CONN}$ pin b5 may be used for a search (discovery) for USB-PD devices and for other controls.

For ease of description, in the present exemplary embodiment, pins b2, b3, b10, and b11 are not used. The cable 230 may therefore include twelve signal lines (one of which is used for both "GND" and "V$_{BUS}$").

<Packet Format on CC Pin>

Figures 4A, 4B, 4C, 4D:
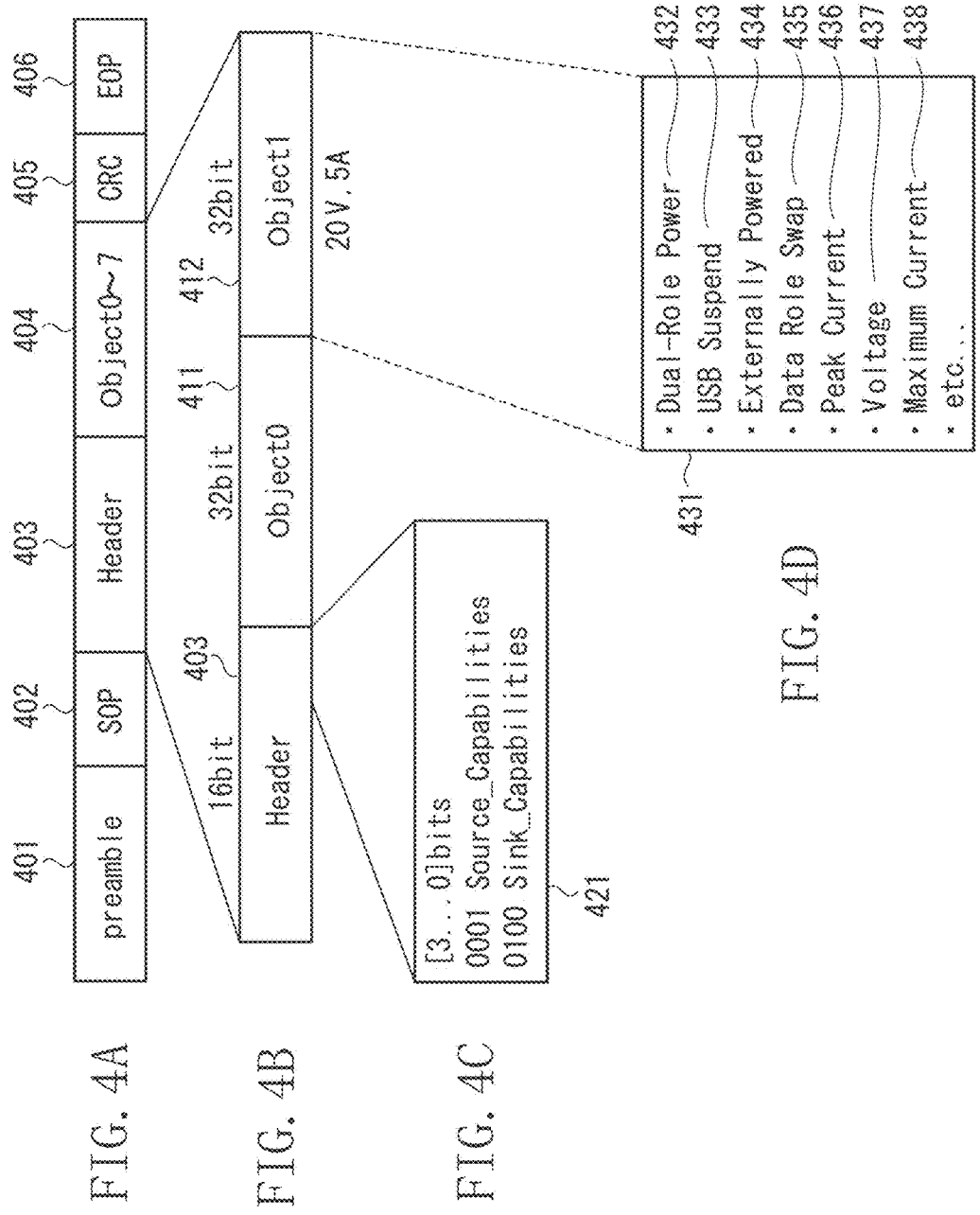
FIG. 4A is a schematic diagram illustrating a configuration channel (CC) packet format.
FIG. 4B is a schematic diagram illustrating a CC message format.
FIG. 4C is a schematic diagram illustrating message types.
FIG. 4D is a schematic diagram illustrating contents of capability information.

FIG. 4A illustrates a packet format for use in communication between the information processing apparatus 200 and the external apparatus 900 via the CC pin. A preamble 401 is binary data intended for training on the reception side. A start of packet (SOP) 402 is 20-bit symbol data indicating a start of a packet. A header 403 and an object or objects 404 are part of a message (data to be interpreted on the protocol layer). The header 403 is 16-bit information, four bits (message type 421) of which indicate the type of message. Like 4-bit information illustrated in FIG. 4C, the message type 421 can indicate "0001: power transmission capability information (Source Capabilities)" and "0100: power reception capability information (Sink_Capabilities)".

The 32-bit object(s) 404 is/are the message contents. One message can include up to eight objects 404. The objects 404 may be omitted depending on the message type 421. For example, if the message type 421 is "0001: GoodCRC (good cyclic redundancy check (CRC))", the objects 404 may be omitted. A CRC 405 is an error correction code. An end of packet (EOP) 406 is a symbol indicating an end of the packet.

The message type 421 illustrated in FIG. 4C indicates power transmission capability information. In fact, the message type 421 indicates a message including two contents, an object 411 and an object 412, as the power transmission capability information. The object 411 indicates an initial state (vSafe5V) for power supply. The object 412 indicates that power can be supplied at 20 V and 5 A. FIG. 4D illustrates details of power transmission capability information 431 included in the object 412.

Power role information 432 indicates whether the information processing apparatus 200 can switch between the source and sink functions. Power saving support information 433 indicates whether the USB control unit 210 of the information processing apparatus 200 can enter the power saving mode. The power saving support information 433 can be reflected on the external apparatus 900. External power supply information 434 indicates whether the information processing apparatus 200 is mainly powered by an AC power supply. Data role information 435 indicates whether the information processing apparatus 200 can switch between data transmitter (host) and data receiver (device) functions. The power role information 432, the power saving support information 433, the external power supply information 434, and the data role information 435 can be expressed by one bit each. For example, being enabled can be expressed by 1, and being disabled by 0. Suppose that the information processing apparatus 200 can switch between the source and sink functions, will not enter the power saving mode, is not connected to an AC adapter, and can operate both as a host and as a device. In such a case, the object 412 includes "1, 0, 0, 1".

While the contents of the configuration register in the register group 225 are modified by the processor core 222 to cancel the Dual Role setting, the power role information 432 output from the information processing apparatus 200 to the external apparatus 900 is set to "0".

<Configuration Register and Status Register>

FIG. 10 illustrates an overview of a configuration register 1000 and a status register 1010 in the register group 225.

A field Dual Role 1001 indicates whether the Dual Role setting of the information processing apparatus 200 is enabled. In an initial state, the field Dual Role 1001 is set at "1 (Dual Role enabled)" which indicates that the information processing apparatus 200 can function both as a source and as a sink. If the processor core 222 makes register access to cancel the Dual Role setting, the field Dual Role 1001 is set to "0 (Dual Role disabled)". The field Dual Role 1001 returns to "1" when initialized.

A field Power save 1002 indicates whether the USB control unit 210 is restricted from entering the power saving mode. In an initial state, the field Power save 1002 is set to "0 (restriction disabled)". If the processor core 222 makes a setting to temporarily restrict the power saving mode in step S806, the field Power save 1002 is set to "1 (restriction enabled)" by a register access.

A field Power control policy 1003 stores the power control policy determined by the processor core 222 based on the contents of steps S102 to S105. For example, the field Power control policy 1003 stores role information indicating whether to make the information processing apparatus 200 function as a source or a sink or whether to omit power transfer, and a supplied power level (a value corresponding to a voltage value and a value corresponding to a current value). The field Power control policy 1003 also includes stopping condition information, an in-process flag, and a completion flag. The stopping condition information includes the power reception stopping condition or the power transmission stopping condition set from the window 501. The processor core 222 sets and enables the in-process flag if a ready signal is received from the external apparatus 900 in response to the request transmitted in step S802, or when a ready signal indicating readiness for power transmission is output based on the request accepted in step S806. The processor core 222 sets and enables the completion flag in the processing of step S809 or S805.

A field "battery level (0)" 1011 contains information indicating the remaining battery level of the battery 212 of the information processing apparatus 200. A field "battery level (1)" 1012 contains information indicating the remaining battery level of the external apparatus 900. The processor core 222 updates the remaining battery level of the external apparatus 900 if the remaining battery level is included in the capability information or status information obtained by the connector unit 231 from the external apparatus 900.

As described above, in the present exemplary embodiment, the information processing apparatus 200 provides display for determining the direction in which power is transferred when needed, and performs control based on the determined power control policy. Reciprocation of power between devices can thus be suppressed. The Dual Role setting is cancelled while control is performed based on the determined power control policy. This can further reduce power loss. The reason is that if the processor core 222 cancels the Dual Role setting, the power role information 432 about the packet transmitted from the information processing apparatus 200 to the external apparatus 900 is disabled to suppress excessive switching of the power roles.

In the present exemplary embodiment, if the power reception stopping condition or the power transmission stopping condition is set, the information processing apparatus 200 controls the USB control unit of the external apparatus 900 or the information processing apparatus 200 itself not to enter the power saving mode. Such control can suppress interruption of power transmission or power reception in cases where the USB control unit 210 enters the power saving mode and the power reception stopping condition or the power transmission stopping condition fails to be satisfied.

In the foregoing exemplary embodiment, the cable 230 supporting the CC signal line is described to be used. However, Type-A and Type-B cables may be used. Type-A and Type-B plugs may not support a CC signal line. In such a case, capability information may be transmitted and received via a $V_{BUS}$ pin instead of the CC pin.

In the foregoing exemplary embodiment, the disconnection of the cable 230 is detected as "non (detached)". However, the disconnection may be detected by other methods. All messages transmitted from the information processing apparatus 200 to the external apparatus 900 are accompanied by a CRC. The external apparatus 900 returns a "GoodCRC" message in response to the CRC. Then, the disconnection can be determined if a "GoodCRC" message does not return within a predetermined time since the output of a message from the information processing apparatus 200. The status register and the configuration register are initialized based on the disconnection.

In the present exemplary embodiment, for ease of description, a source and a sink are described to be switched in units of each information processing apparatus 200. However, the connection units may be individually controlled to be a source or a sink each. In such a case, components such as the configuration register and the status register may be provided as many as the number of connection units.

If the determination in step S102 or S103 is "YES", the respective USB control units of the information processing apparatus 200 and the external apparatus 900 may be controlled not to enter the power saving mode.

If the determination in step S102 or S103 is "YES" or the determination in step S104 is "NO", the UI 203 may make a notification about the determined power control policy without waiting for the acceptance of the user's instruction. The user may touch the notification to advance the processing to step S105. For example, suppose that the information processing apparatus 200 is powered by an AC power supply in step S102. Even in such a case, the user may intend to disconnect the existing connection with the AC power supply once USB-PD power supply is established. If "YES" in step S102, the UI 203 may then display only a notification for accepting selection whether to replace the existing AC power supply with the USB-PD connection of which new control communication is established.

In the first exemplary embodiment, the information processing apparatus 200 is described to cancel the Dual Role setting of its own configuration register when the information processing apparatus 200 performs power control based on the determined power control policy. By such control, the external apparatus 900 is substantially prevented from issuing a request to swap the roles (Port Power Role Swap message: hereinafter, referred to as a role swap request) to the information processing apparatus 200.

A second exemplary embodiment deals with a mode in which information processing apparatuses 200 that do not cancel the Dual Role setting are connected to each other. In other words, in the present exemplary embodiment, the two information processing apparatuses 200 are configured so that even when the information processing apparatuses 200 are performing power supply control therebetween based on a power control policy determined by either one of the information processing apparatuses 200, the other information processing apparatus 200 can still transmit a role swap request. For example, if the other information processing apparatus 200 transmits a role swap request (power transmission) undesirable to the user, while the one information processing apparatus 200 is receiving power, an undesirable role swap may occur.

In the present exemplary embodiment, two information processing apparatuses 200A and 200B are described to be connected by a cable 230. Components and steps having similar functions to those of the first exemplary embodiment will be designated by the same reference numerals. A description of those that are similar in terms of configuration or function will be omitted. The information processing apparatuses 200A and 200B have the configuration illustrated in FIG. 2.

Figure 11:
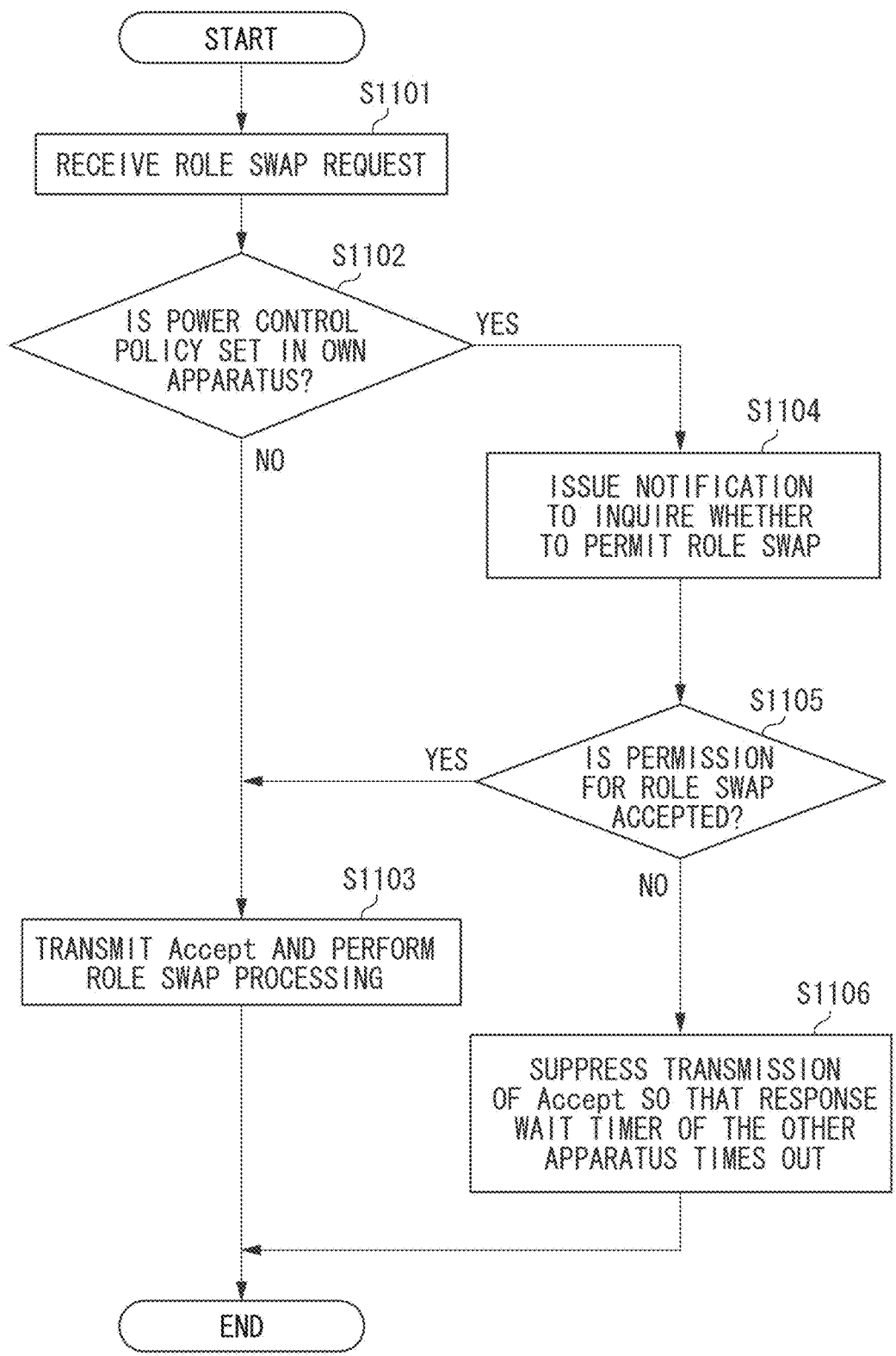
FIG. 11 is a flowchart illustrating an outline of processing for making a determination about a received role swap request.

FIG. 11 is a flowchart illustrating processing by which the information processing apparatus 200A according to the present exemplary embodiment confirms a role swap when the information processing apparatus 200A receives a role swap request from the other information processing apparatus 200B.

In step S1101, the processor core 222 of the information processing apparatus 200A receives a role swap request transmitted from the information processing apparatus 200B via the CC pin of a Type-C connector of the connector unit 231. Receiving the role swap request, the information processing apparatus 200A suppresses output of a role swap request from itself.

In step S1102, the processor core 222 of the information processing apparatus 200A refers to the field Power control Policy 1003 of the register group 225 and checks whether a power control policy for processing power transmission or power reception is set in the own apparatus. If no power control policy is set (NO in step S1102), the processing proceeds to step S1103.

In step S1103, the processor core 222 of the information processing apparatus 200A transmits a message (Accept) indicating the acceptance of the role swap request, and performs its own role swap processing.

In step S1102, if a power control policy is set in the information processing apparatus 200A (YES in step S1102), the processing proceeds to step S1104. In step S1104, the processor core 222 issues a notification to inquire whether to permit a role swap. The notification will be described below with reference to FIG. 12.

In step S1105, the processor core 222 determines whether permission for the role swap is accepted from the user. If the permission for the role swap is accepted from the user (YES in step S1105), the processing proceeds to step S1103.

On the other hand, if rejection of the role swap is accepted from the user (NO in step S1105), the processing proceeds to step S1106. In step S1106, the processor core 222 suppresses the message (Accept) indicating that the role swap request is accepted, so that a response wait timer of the other apparatus (information processing apparatus 200B) for the role swap request times out.

In steps S1103 and S1106, the information processing apparatus 200A cancels the suppression of output of a role swap request from the own apparatus.

Figure 12:
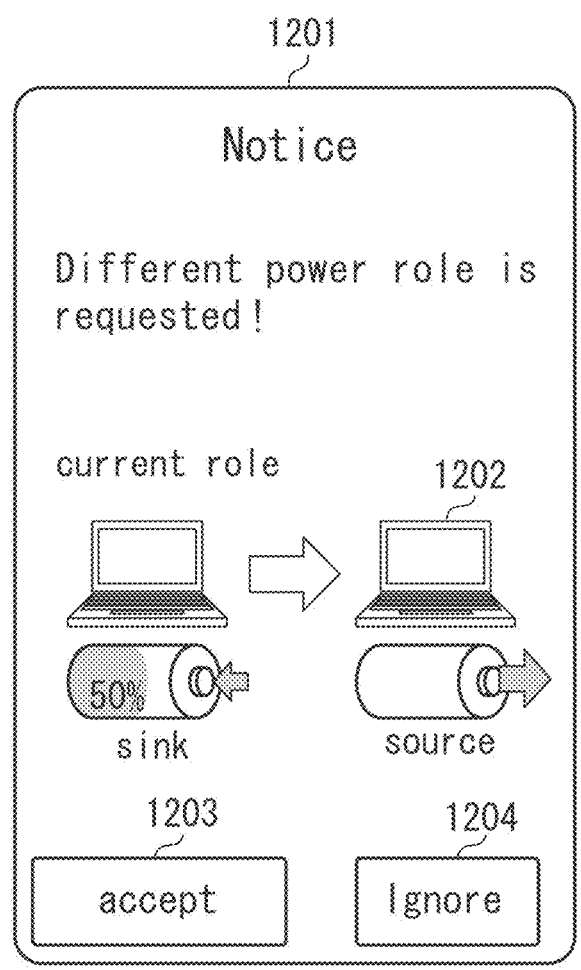
FIG. 12 is a schematic diagram illustrating a display screen for specifying permission for a role swap.

FIG. 12 is a schematic diagram illustrating a notification screen 1201 of step S1104. The processor core 222 makes the UI 203 display the notification screen 1201. A state display 1202 schematically shows the current state of the information processing apparatus 200A and a case when the role swap request is accepted. The processor core 222 displays the state of the information processing apparatus 200A based on the foregoing status and configuration registers.

A permission button 1203 is a button for the user to press to permit the role swap request. An ignore button 1204 is a button for the user to press to reject the role swap request.

As described above, according to the present exemplary embodiment, if a role swap request that is likely to be undesirable to the user is accepted after determination of a power control policy, whether to swap roles can be determined by appropriately reflecting the user's intention.

In the present exemplary embodiment, if the two information processing apparatuses 200A and 200B make requests in different power transmission directions, the user's permission is asked. However, the user may simply be notified if stopping conditions are set in the two respective information processing apparatuses 200A and 200B.

An exemplary embodiment of the disclosure may be implemented by executing the following processing. The processing includes supplying software (program) for implementing the functions of the foregoing exemplary embodiments to a system or an apparatus via a network or various recording media, and reading and executing the program by a computer (or CPU or micro processing unit (MPU)) of the system or apparatus.

While the exemplary embodiments of the disclosure have been described in detail above, the disclosure is not limited to such specific exemplary embodiments, and various modes not departing from the gist of the disclosure are also included in the disclosure. Part of the foregoing exemplary embodiments may be combined as appropriate.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-132871, filed Jul. 4, 2016, which is hereby incorporated by reference herein in its entirety.

What is claimed is:

1. An apparatus comprising:
   at least one processor; and
   a memory coupled to the at least one processor, the memory having instructions that, when executed by the processor, performs operations as:
   an acquisition unit configured to obtain capability information from an external apparatus via a connection unit, the capability information indicating that the external apparatus is capable of switching between a function as a source and a function as a sink;
   an acceptance unit configured to accept an instruction from a user based on the capability information; and
   a control unit configured to perform control about one of a plurality of states based on the instruction, the plurality of states including a power transmission state in which power is transmitted to the external apparatus and a power reception state in which power is received from the external apparatus,
   acceptance unit is configured to omit acceptance of the instruction from the user based on the capability information.

2. The apparatus according to claim 1, wherein the acceptance unit includes a graphic user interface and is configured to change display and/or control based on the capability information.

3. The apparatus according to claim 1, wherein the capability information further includes power saving support information indicating whether the connection unit is capable of entering a power saving mode, and external power supply information indicating whether the external apparatus is connected to an external power supply.

4. The apparatus according to claim 1, further comprising:
   a determination unit configured to determine a power control policy based on the instruction; and
   a register,
   wherein the determination unit is configured to perform control to write the power control policy into the register.

5. The apparatus according to claim 4, wherein the power control policy includes information indicating in which state to operate the information processing apparatus among the plurality of states including the power transmission state and the power reception state.

6. The apparatus according to claim 4, wherein the power control policy includes a power transmission stopping condition in the power transmission state or a power reception stopping condition in the power reception state.

7. The apparatus according to claim 6, wherein the power reception stopping condition or the power transmission stopping condition is that a remaining battery level of the apparatus reaches a predetermined ratio.

8. The apparatus according to claim 6, wherein the power reception stopping condition or the power transmission stopping condition is that a remaining battery level of the external apparatus reaches a predetermined ratio.

9. The apparatus according to claim 6, wherein the power reception stopping condition or the power transmission stopping condition is that a connection between the apparatus and the external apparatus via the connection unit is disconnected.

10. The apparatus according to claim 6, wherein the power reception stopping condition or the power transmission stopping condition is that a duration of power reception or power transmission by the apparatus via the connection unit reaches a predetermined time.

11. The apparatus according to claim 4, wherein the power control policy includes a power level to request from the external apparatus.

12. The apparatus according to claim 4, wherein the determination unit is configured to, if the capability information includes valid external power supply information, issue a request without waiting for the instruction from the user, the request requesting the external apparatus to transmit power to the apparatus and a power control unit of the external apparatus not to enter a power saving state.

13. The apparatus according to claim 4, wherein the determination unit is configured to, if the capability information does not include valid external power supply information, determine the power control policy based on the instruction after acceptance of the instruction from the user.

14. The apparatus according to claim 4, further comprising a nonvolatile memory configured to store device information about the external apparatus and the power control policy in association with each other,
    wherein the determination unit is configured to search the nonvolatile memory based on the device information, and
    wherein the control unit is configured to, if there is a hit, control power based on the power control policy corresponding to the hit device information.

15. The apparatus according to claim 1, further comprising a notification unit configured to, if the acquisition unit accepts a role swap request from the external apparatus and a power control policy is set in the apparatus, notify the user of the role swap request.

16. A method of an apparatus comprising:
    obtaining capability information from an external apparatus via a connection unit, the capability information indicating that the external apparatus is capable of switching between a function as a source and a function as a sink;
    accepting an instruction from a user based on the capability information; and
    performing control about one of a plurality of states based on the instruction, the plurality of states including a power transmission state in which power is transmitted to the external apparatus and a power reception state in which power is received from the external apparatus,
    accepting includes omitting acceptance of the instruction from the user based on the capability information.

17. The method according to claim 16, further comprising notifying, if the accepting accepts a role swap request from the external apparatus and a power control policy is set in the apparatus, the user of the role swap request.

18. A non-transitory recording medium recording a computer-readable program for causing a computer to function as:
    an acquisition unit configured to obtain capability information from an external apparatus via a connection unit, the capability information indicating that the external apparatus is capable of switching between a function as a source and a function as a sink;
    an acceptance unit configured to accept an instruction from a user based on the capability information; and
    a control unit configured to perform control about one of a plurality of states based on the instruction, the plurality of states including a power transmission state in which power is transmitted to the external apparatus and a power reception state in which power is received from the external apparatus,
    wherein the acceptance unit is configured to omit acceptance of the instruction from the user based on the capability information.

19. The non-transitory recording medium according to claim 18, further comprising a notification unit configured to, if the acquisition unit accepts a role swap request from the external apparatus and a power control policy is set in the apparatus, notify the user of the role swap request.

* * * * *